(12) United States Patent
Taich et al.

(10) Patent No.: US 8,885,662 B2
(45) Date of Patent: *Nov. 11, 2014

(54) CONTROLLING ACTIVATION OF ELECTRONIC CIRCUITRY OF DATA PORTS OF A COMMUNICATION SYSTEM

(75) Inventors: Dimitry Taich, San Jose, CA (US); Jose Tellado, Mountain View, CA (US)

(73) Assignee: Aquantia Corp., Milpitas, CA (US)

( * ) Notice: Subject to any disclaimer, the term of this patent is extended or adjusted under 35 U.S.C. 154(b) by 1012 days.

This patent is subject to a terminal disclaimer.

(21) Appl. No.: 12/960,481

(22) Filed: Dec. 4, 2010

(65) Prior Publication Data

US 2011/0074592 A1    Mar. 31, 2011

Related U.S. Application Data

(63) Continuation of application No. 12/290,181, filed on Oct. 28, 2008, now Pat. No. 7,881,330.

(51) Int. Cl.
*H04L 12/66* (2006.01)
*H04L 7/00* (2006.01)
*H04L 7/10* (2006.01)

(52) U.S. Cl.
CPC ............... *H04L 7/0083* (2013.01); *H04L 7/10* (2013.01)
USPC ........... 370/463; 370/503; 370/438; 709/228; 709/229

(58) Field of Classification Search
CPC ............................. H04L 7/0083; H04L 7/10
USPC ......... 370/436–444, 503, 507, 509, 513–515, 370/463; 709/228, 229
See application file for complete search history.

(56) References Cited

U.S. PATENT DOCUMENTS

| | | | |
|---|---|---|---|
| 7,245,631 B2 | 7/2007 | Sano et al. | |
| 7,577,180 B2 | 8/2009 | Boulton | |
| 8,363,652 B2 * | 1/2013 | Handelman | 370/391 |
| 8,594,091 B2 * | 11/2013 | Handelman | 370/391 |
| 2003/0095783 A1 * | 5/2003 | Binder et al. | 386/46 |
| 2005/0083954 A1 | 4/2005 | Meyer-Grafe | |
| 2005/0286643 A1 * | 12/2005 | Ozawa et al. | 375/242 |
| 2008/0205437 A1 * | 8/2008 | Cole | 370/464 |
| 2008/0298384 A1 | 12/2008 | Beaucage | |
| 2009/0037634 A1 | 2/2009 | Kuris | |
| 2009/0122881 A1 | 5/2009 | Geile | |
| 2009/0285241 A1 | 11/2009 | Zhang et al. | |
| 2010/0046436 A1 * | 2/2010 | Doviak et al. | 370/328 |
| 2010/0141317 A1 | 6/2010 | Szajnowski | |

* cited by examiner

*Primary Examiner* — Ayaz Sheikh
*Assistant Examiner* — Mounir Moutaouakil
(74) *Attorney, Agent, or Firm* — Lance Kriesman; Peninsula Patent Group

(57) ABSTRACT

An apparatus and method of controlling activation of electronic circuitry of data ports of a communication system is disclosed. One method includes a first data port detecting a lack of data for transmission to a second data port. At least one of the first data port and a second data port deactivate electronic circuitry of at least one of the first and second data ports upon detection of the lack of data. The first and second data ports maintain synchronization with each other while the electronic circuitry is deactivated by periodically exchanging synchronization test patterns. At least one of the first data port and the second data port transmit an alert to the other of the first and second data port when data for communication is detected. The other of the first data port and the second data port activate electronic circuitry upon receiving the alert. At least one of the first data port and the second data port transmit data.

8 Claims, 7 Drawing Sheets

1 ($a_0$)    1  -1 -1 -1 -1 -1 -1  1  1 -1 -1  1  1  1  1

1 ($a_{16}$)   1   1  1 -1 -1  1  1  1 -1 -1 -1  1  1 -1 -1

-1 ($a_{32}$)  -1  -1 -1 -1 -1  1  1 -1 -1 -1 -1  1  1  1  1

-1 ($a_{48}$)  -1  -1 -1 -1 -1 -1 -1  1  1 -1 -1  1  1 -1 -1

-1 ($a_{64}$)  -1   1  1  1  1  1  1  1  1  1 -1 -1 -1 -1

1 ($a_{80}$)   1  -1 -1 -1 -1  1  1  1  1 -1 -1 -1 -1 -1 -1

-1 ($a_{96}$)  -1  -1 -1 -1 -1 -1 -1  1  1  1  1 -1 -1 -1 -1

1 ($a_{112}$)  1  -1 -1  1  1 -1 -1  1  1  1  1 -1 -1 -1 -1

Alert Signal Pattern with 128
serially transmitted symbols

FIGURE 3

CONTROLLING ACTIVATION OF ELECTRONIC CIRCUITRY OF DATA PORTS OF A COMMUNICATION SYSTEM

RELATED APPLICATIONS

This patent application is a continuation of U.S. patent application Ser. No. 12/290,181 filed Oct. 28, 2008, titled "CONTROLLING ACTIVATION OF ELECTRONIC CIRCUITRY OF DATA PORTS OF A COMMUNICATION SYSTEM".

FIELD OF THE INVENTION

The invention relates generally to communication systems. More particularly, the invention relates to controlling activation of electronic circuitry of data ports of a communication system.

BACKGROUND OF THE INVENTION

High-speed LAN technologies using copper cables include 10BASE-T, 100BASE-T (Fast Ethernet), 1000BASE-T (Gigabit Ethernet), and 10GBASE-T. These high-speed LAN technologies include link partner transceivers that can communicate, for example, over a bi-directional transmission channel. An exemplary transmission channel includes four pairs of copper wire.

Proper operation of the Ethernet link partner transceivers requires them to be synchronized. Synchronization can be obtained by one link partner phase-locking a clock to data signals transmitted by the other link partner. The transmitter and receiver processing of the transceiver link partners are clocked by the phase-locked clock.

In order to maintain synchronization, and to minimize latency of data transmission between the link partners, the transmitting and receiving link partners of 10BASE-T systems maintain full operational power even when no data transmission is occurring. However, continually maintaining full operation of the transceiver link partners consumes significant amounts of power, typically, the majority of the power consumption required to maintain the link between the transceiver link partners.

It is desirable to have a system, apparatus and method of reducing the power dissipated by electrically connected transceivers without substantially impacting the operating performance of the transceivers.

SUMMARY OF THE INVENTION

An embodiment includes a method of controlling activation of electronic circuitry of data ports of a communication system. The method includes a first data port detecting a lack of data for transmission to a second data port. At least one of the first data port and a second data port deactivate electronic circuitry of at least one of the first and second data ports upon detection of the lack of data. The first and second data ports maintain synchronization with each other while a majority of the electronic circuitry is deactivated. At least one of the first data port and the second data port transmit an alert to the other of the first and second data port when data for communication is detected. The other of the first data port and the second data port activate electronic circuitry upon receiving the alert. At least one of the first data port and the second data port transmit data.

Another embodiment includes a method of controlling activation of electronic circuitry of a data port of a communication system. The method includes the data port detecting a lack of data for transmission to a second data port. If a lack of data communication is detected, the data port deactivates electronic circuitry of the data port. The data port and a second data port maintain synchronization with each other while the electronic circuitry is deactivated by periodically exchanging synchronization test patterns. The data port transmits an alert to the second data port when data for communication is detected. The data port then transmits data.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 shows an exemplary alert that includes a series of symbols that include desirable signal properties.

DETAILED DESCRIPTION

The describe embodiments includes an apparatus and method for reducing power dissipation of operating connected data ports while minimally impacting latency of data communication between data ports.

It is to be appreciated that the present teaching is by way of example, not by limitation. Therefore, although the embodiments described herein are for convenience of explanation, it is to be appreciated that the principles herein may be applied equally to other configurations of power conservation of communications between link partner transceivers.

Figure 1:
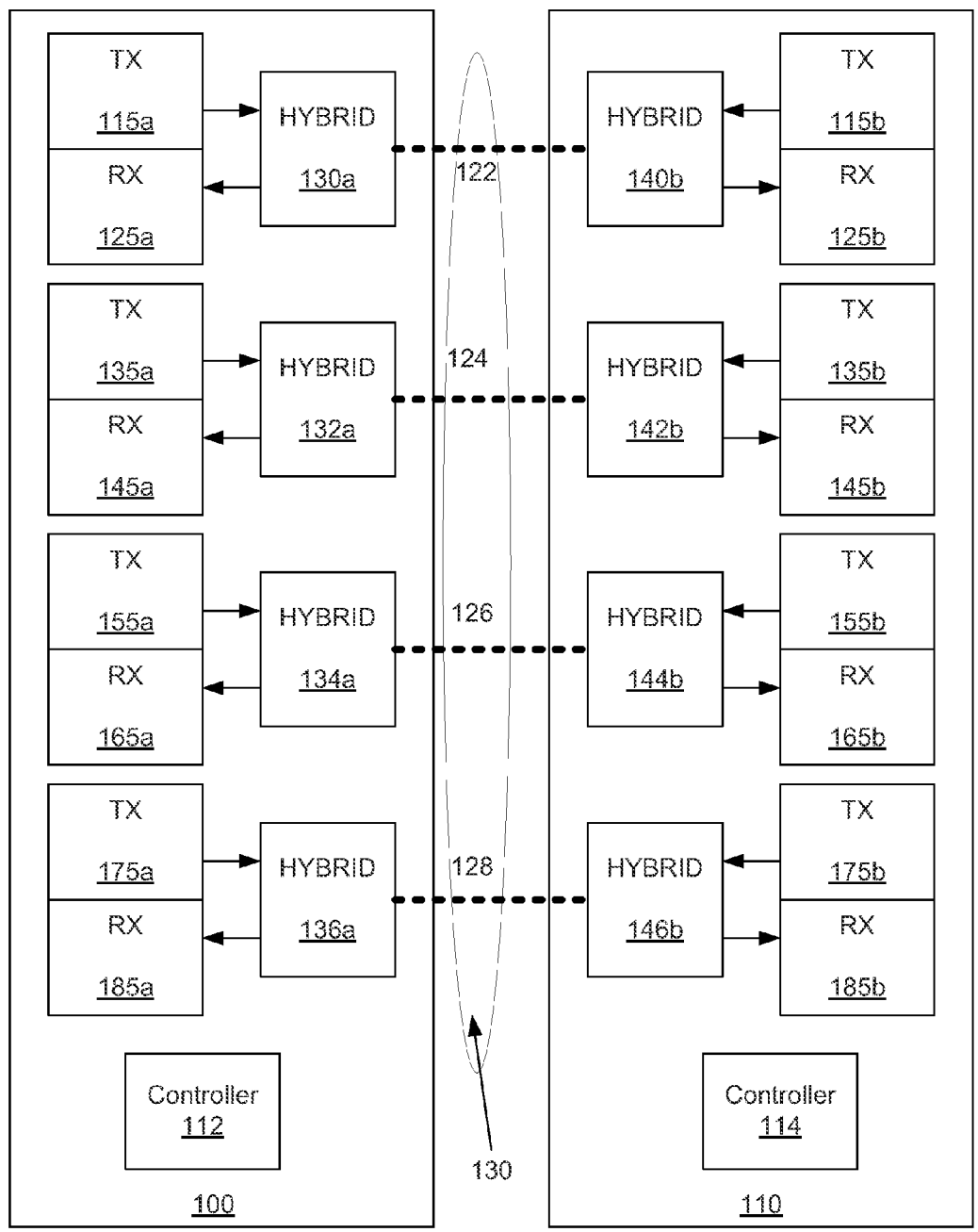
FIG. 1 shows one example of a first transceiver and a second transceiver connected by a cable that can maintain synchronization between the transceivers, and minimize power dissipation of the transceivers while minimally impacting data transmission latency of data transmitted between the transceivers.

FIG. 1 shows one example of a first transceiver 100 and a second transceiver 110 connected by a cable 130. According to described embodiments, the transceivers 100, 110 maintain synchronization between the transceivers 100, 110, and minimize power dissipation of the transceivers 100, 110 while minimally impacting data transmission latency of data transmitted between the transceivers 100, 110.

As shown, the exemplary cable 130 includes four "lanes" 122, 124, 126, 128. Data ports of the transceivers 100, 110 are electrically connected though wire connections of the lanes 122, 124, 126, 128. As shown, each of the transceivers 100, 110 includes four separate front-end portions and joint logic portion.

The embodiment of FIG. 1 includes the first connection 122 between a first transceiver (first transmitter 115a and first receiver 125a), and a second transceiver (second transmitter 115b and a second receiver 125b). The second connection 124 is between a third transceiver (third transmitter 135a and third receiver 145a), and a transceiver (fourth transmitter 135b and a fourth receiver 145b). The third connection 126 is between a fifth transceiver (fifth transmitter 155a and fifth receiver 165a), and a sixth transceiver (sixth transmitter 155b and a sixth receiver 165b). The fourth connection 128 is between a seventh transceiver (seventh transmitter 175a and seventh receiver 185a), and an eighth transceiver (eighth transmitter 175b and an eighth receiver 185b). This embodiment additionally includes hybrid circuits 130a, 140b, 132a, 142b, 134a, 144b, 136a, 146b between the transmitters and receivers.

The transceivers 100, 110 include processing (controllers 112, 114) that control data path configurations of the transceivers 100, 110. When data transmission has at least temporarily ceased, the transceivers 100, 110 deactivate selected portions of electronic circuitry, allowing the transceivers 100, 110 to operate at lower power consumption levels. During the periods of deactivated electronic circuitry, the transceivers 100, 110 maintain synchronization with each other by periodically activating selected portions of the electronic circuitry for updating parameters, and exchanging synchronization patterns. The deactivated circuitry is selectable, but generally, at least timing circuitry of the transceivers 100, 110 is activated when synchronization patterns are exchanged between transceivers 100, 110.

While de-activated, a transceiver detecting the data for communication transmits an alert signal to the other transceiver (link partner). The alert signal prompts the other transceiver to reactivate its electronic circuitry. After reactivating electronic circuitry, and after a wake up period, the transceivers restart data transmission. If timing of the alert signal and wake up are properly controlled, the impact on the network throughput (data throughput between the transceivers 100, 110) due to deactivation of the electronic circuitry can be minimized. The wake up period is a period of time in which the electronic circuitry reactivates, and signal processing (such as re-establishing signal processing coefficients of equalizers and echo cancellers) is updated.

Figure 2:
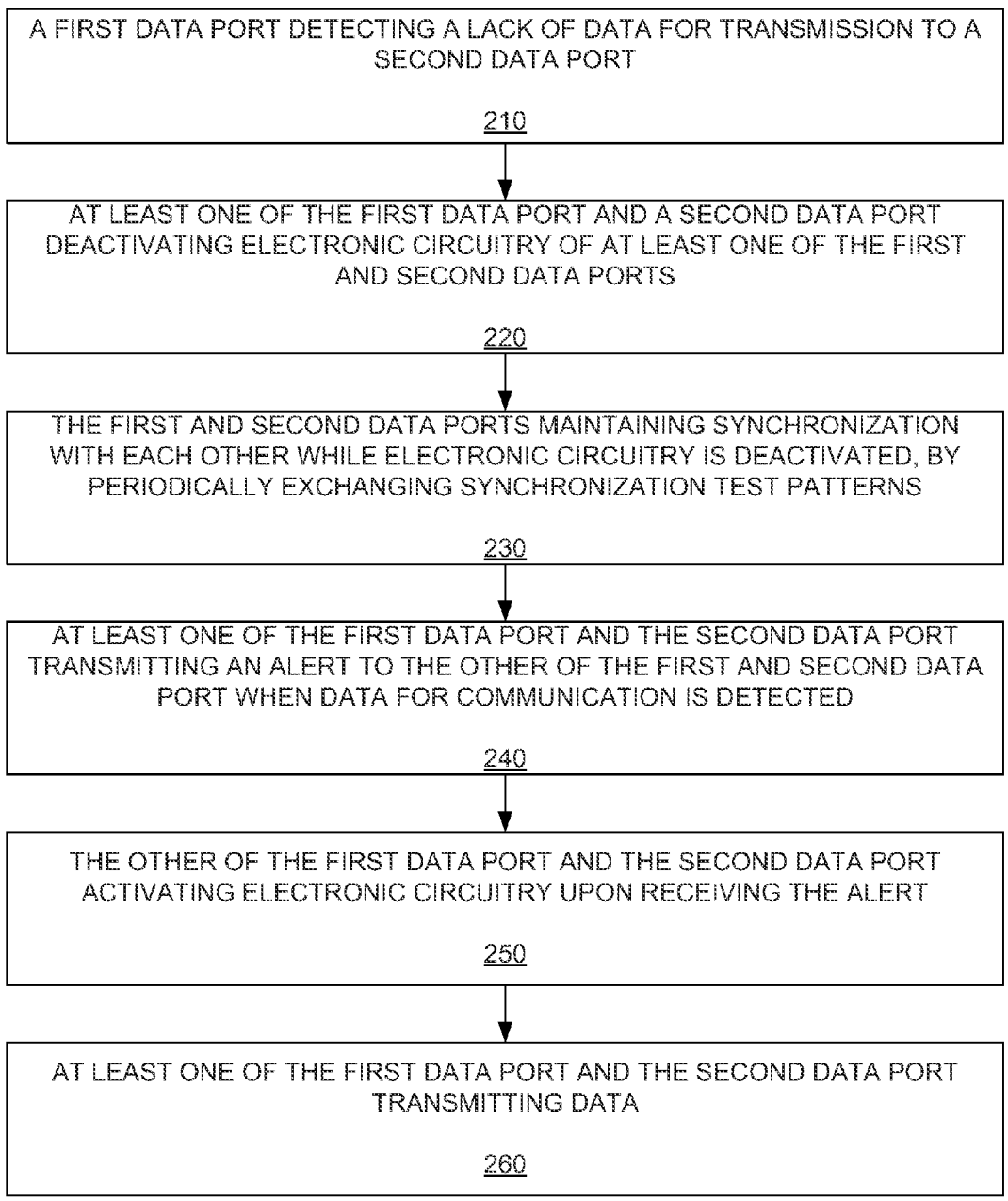
FIG. 2 is a flow chart showing steps of one example of a method of controlling activation of electronic circuitry of data ports of a communication system.

FIG. 2 is a flow chart showing steps of one example of a method of controlling activation of electronic circuitry of data ports of a communication system. A first step 210 includes a first data port detecting a lack of data for transmission to a second data port. A second step 220 includes at least one of the first data port and a second data port deactivating electronic circuitry of at least one of the first and second data ports. Deactivation typically includes a sleep period in which, for example, link partners synchronously deactivate portions of the receive/transmit circuitry. A third step 230 includes the first and second data ports maintaining synchronization with each other while the electronic circuitry is deactivated by periodically exchanging synchronization test patterns. To allow the exchange of synchronization test patterns, select electronic circuitry (such as, timing circuits) can be activated as determined by a predetermined or negotiated schedule. A fourth step 240 includes at least one of the first data port and the second data port transmitting an alert to the other of the first and second data port when data for communication is detected. A fifth step 250 includes the other of the first data port and the second data port activating electronic circuitry upon receiving the alert. A sixth step 260 includes at least one of the first data port and the second data port transmitting data.

The timing circuits can include, for example, master/slave clocking circuitry. For a link partner pair, one of the transceivers can be designated as a master, and the other transceiver can be designated as a slave. For an embodiment, the master clocking circuitry of the master transceiver uses a common reference clock for receive and transmit circuitry, whereas slave circuitry of the slave transceiver typically includes a phase-locked loop for synchronizing to a master clock of master transceiver.

Synchronization between master and slave transceivers is generally required to ensure reliable initialization between the master and slave link partners. Current status information of a link partner allows for a reliable prediction of next stage and/or action by the link partner in some embodiments, the slave transceiver provides the master transceiver with slave clock signal information, allowing the master transceiver to adapt its processing.

For an embodiment, data communication between the first data port and the second data port includes a plurality wired connections connected to the first data port and the second data port, and the alert is transmitted over a subset of the plurality of wired connections. For example, a 10GBASE-T Ethernet data port typically includes four wire connections. The alert can be transmitted, for example, over one of the four wire connections.

Another embodiment further includes designating predetermined time slots, wherein an alert is only transmitted during at least one of the predetermined time slots. Embodiments include alerts only being transmitted during the designated time slots. However, many time slots can be designated. Alerts are only transmitted during at least one of the predetermined time slots when the transceiver determines data is ready for transmission. The transceiver receiving the alert only activates its electronic circuitry when receiving an alert from a link partner transceiver.

A time period between the predetermined time slots can be adaptively selected. The time period can be adaptively selected based on, for example, a buffer size of at least one of the first data port and the second data port. The more frequently the time slots occur, generally (assuming some other limit to the latency is not present) the less the latency required to activate the electronic circuitry needed for transmission. As will be described later, as the period between time slots decreases, the more frequently alerts are allowed to be transmitted, and therefore, the latency decreased. If the period between time slots is decreased to zero, then there are not time constraints on when an alert can be transmitted.

Different protocols can have different latency requirements. That is, for example, 10BASE-T will typically have a different latency requirement than 100BASE-T (Fast Ethernet). As previously described, the latency requirements can dictate to some extent, limits to the time period between the predetermined time slots.

A time-duration of the predetermined time slots can be adaptively selected based on, for example, required operational speeds of, for example, 100BASE-T (Fast Ethernet), 1000BASE-T (Gigabit Ethernet), and 10GBASE-T protocols. Other considerations include, for example, target values for false alarms detection or/and misdetection of the alert signal.

If an alert is transmitted in one direction between link partner transceivers and data communication is being received in the opposite direction, the alert signal can be subjected to large amounts of interference. As such, embodiments include defining the alert signal to have a high-auto-correlation feature.

An embodiment includes the signal formats of the alert signals of different transceivers being selected to have low cross-correlation between each other. This can be useful, for example, if two transceivers simultaneously transmit alert signals during a quiet period in which the transceivers have deactivated electronic circuitry. The deactivated circuitry can include echo cancellation circuitry. Therefore, an alert signal transmitted by a transceiver may have a large echo signal due to the fact that the echo cancellation circuitry is deactivated. However, the transceiver can determine that the echo signal of the alert signal is not an alert signal of another transceiver because the signal formats of the different transceivers have low cross-correlation. That is, the transceiver can readily detect whether a received alert is an echo of its own alert signal, or an alert signal of another transceiver based on the degree of correlation between its own alert signal and the received signal.

Another embodiment includes the alert signal being transmitted on different pairs of the communication cable by link partners. As previously described, the cable between link partners can include four twisted pair connections. During an Auto-Negotiation stage two link partners can determine their roles as master and slave transceivers. That is, one of the transceivers is designated as the master, and the other transceiver is designated as the slave. Each link partner (master and slave) sends the alert signal on predetermined (different) pair of wires (lanes). For example, the master can sends its alert signal on a first lane A and the slave can sends its alert on another lane C. This can be useful, for example, if two transceivers simultaneously transmit alert signals during a quiet period in which the transceivers have deactivated electronic circuitry. The deactivated circuitry can include echo cancellation circuitry. Therefore, an alert signal transmitted by a transceiver may have a large echo signal due to the fact that the echo cancellation circuitry is deactivated. However, the transceiver can determine that the echo signal of the alert signal is not an alert signal of another transceiver transmits alert on different lane (wired pair or channel).

Embodiments include configuring the alert to include a high-autocorrelation signal that ensures the desired level of autocorrelation of the alert. This can be accomplished by selecting a signal format of the alert. For an embodiment the alert signal is selected to have an autocorrelation signal level at least a predetermined amount greater than a received noise level (the received noise can include thermal noise and echo signals). The alert signal level and the echo signal interference can be measured, for example, at a receiving port of the alert signal.

An embodiment includes configuring the alert to have a baud rate less than a baud rate of the data transmission. Typically the insertion loss of, for example, the copper wire links between the link partners increases with frequency. Therefore, higher frequency signals suffer greater insertion loss when transmitted over the wired link. By selecting a lower baud rate for the alerts, the alert signals typically suffer less insertion loss when transmitted across the link between link partners. Therefore, detection of alert signals is generally more effective because alert signals suffer less attenuation when traveling across the link between link partner transceivers.

FIG. 3 shows an exemplary alert signal that includes a series of symbols that include desirable signal properties. The desirable signal properties include, for example, low bandwidth (low frequency components), high auto-correlation, and low cross-correlation with other alert signals. The exemplary alert signal of FIG. 3 includes a series of symbols $A_1=\{a_0$ through $a_{127}\}$. An embodiment includes a link partner having an alert symbol that includes the series of symbols in reverser order. That is, the link partner includes an alert signal of the series of symbols ordered from $A_2=\{a_{127}$ through $a_0\}$.

Figure 4A:
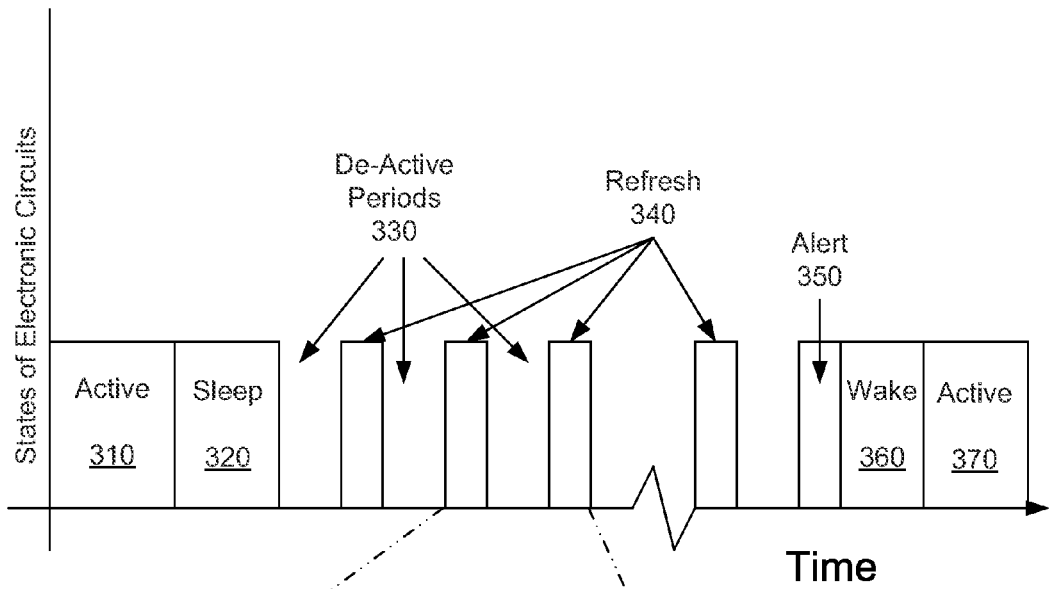
FIG. 4A shows a timeline depicting the states active, deactive of the majority of the electronic circuitry.

FIG. 4A is a time-line showing an example of interaction and communication of signals between data ports of a communication system. The time-line begins with the electronic circuitry of one or both of the data ports being deactivated. The time-line includes a series of refresh signals (Tr is the period of each alert signal) that include synchronization test signals that allow the data ports to maintain synchronization. As previously described, transmission and reception of the refresh signals requires the activation of at least some (for example, timing circuits), but not all, of the electronic circuitry.

The synchronization signals can include, for example, a series of idle symbols that have been properly encoded according to a selected protocol. The selected protocol can be, for example, 100BASE-T (Fast Ethernet), 1000BASE-T (Gigabit Ethernet), or 10GBASE-T.

A period of time between refresh signals can be designated as a quiet period Tq. During the quiet period, minimal electronic circuitry is activated, allowing reduction in power consumption of the electronic circuitry of the transceivers. The quiet period Tq can be selected to be large enough to allow the electronic circuitry to be successfully powered down (deactivated) and the subsequently powered up (activated). When fully powered down, the electronic circuitry conducts virtually no current, resulting is reduced power consumption.

The reduced power consumption $P_{LP}$ (low power) of the transceivers can be approximated as:

$P_{LP}=(P_{Nominal})\times(Tr/Tq)+Pq$, where $P_{Nominal}$ is the power consumption of the transceiver during normal active operation, and Pq is the power (very small) of the transceiver when the electronic circuitry is deactivated (quiet).

As can be observed, the ratio of Tr to Tq should be as small as possible. Tq is generally limited by clock drifts between two transceivers. Tr is generally limited by a minimum number of symbols required for processing engines adaptation. The processing engines adaptation can include, for example, timing and adaptation of filtering, circuits.

When a data port senses that the data port has data for transmission to the other data port, the data port transmits an alert signal to the other data port. Upon receiving the alert signal, the other data port initiates a "wake up" period in which the deactivated electronic circuitry is reactivated. This can include, for example, activating decoders and near-end noise cancellers. When the electronic circuitry is fully activated, data between the data port begins.

FIG. 4A shows a timeline depicting the states (active, de-active) of the majority of the electronic circuitry. More specifically, the timeline shows a time period 310 in which the electronic circuitry is active, a time period 320 referred to as sleep in which the electronic circuitry is in process of being dc-activated, and time periods 330 in which the majority of the electronic circuitry is de-activated. The previously shown and described refresh periods 340 occur while the majority of the electronic circuitry is dc-active. An alert signal 350 prompts a wake up period 360. Following the wake up period 360 is another active region 370, in which the electronic circuitry is again active.

Figure 4B:
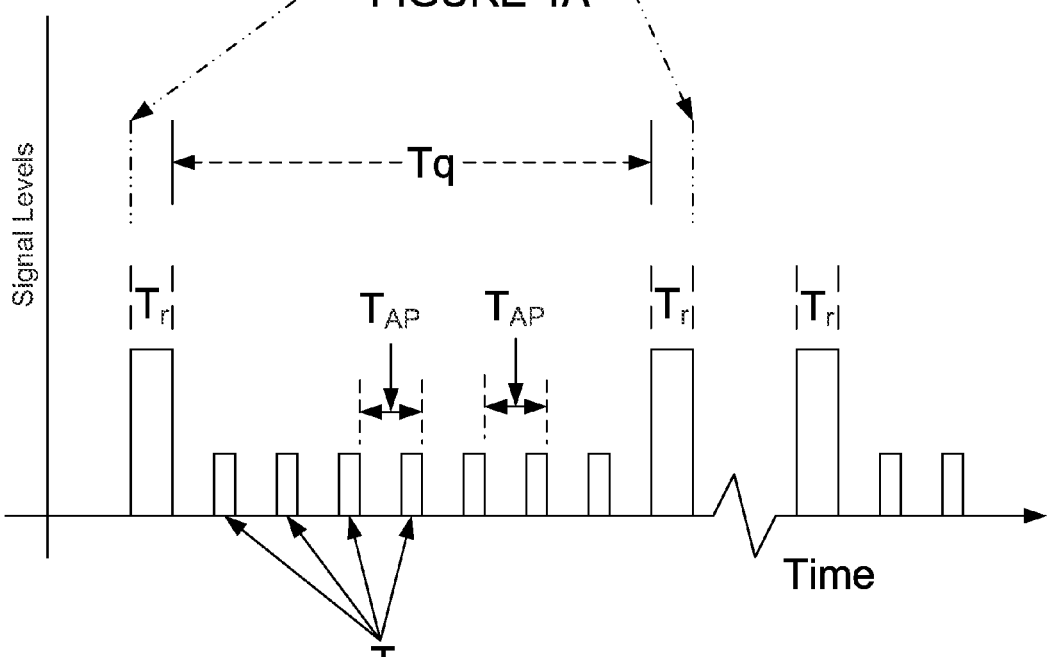
FIG. 4B is a time-line showing an example of interaction and communication of signals between data ports of a communication system.

FIG. 4B also shows alert signal slots $T_A$ in which alert signal can be transmitted. Also depicted is an alert signal period $T_{AP}$ between alert signal slots. Generally, the more frequently the alert signal slots occur, the lower the latency of the reactivation of the electronic circuitry required for data transmission. As previously described, if $T_{AP}$ is zero, then the alert signals can occur at any time. For low latency. $T_{AP}$ is substantially less than Tq. Note that the alert signal slots $T_A$ are slot in which an alert signal can occur if data is ready for transmission. That is, an alert signal does not occur during each of the alert signal slots $T_A$.

Figure 5:
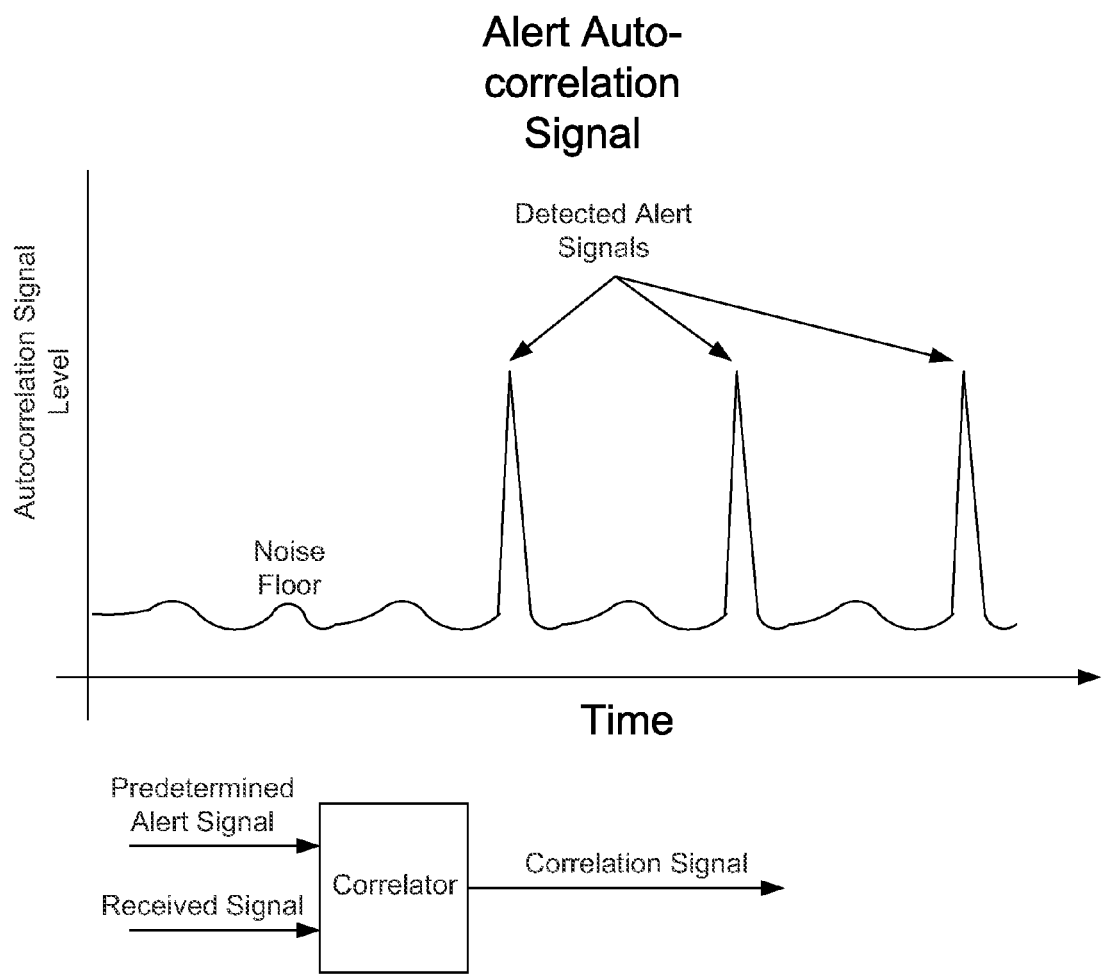
FIG. 5 shows a timeline that depicts an example a received signal that has been correlated with a predetermined alert signal.

FIG. 5 shows a timeline that depicts an example a received signal that has been correlated with a predetermined alert signal. The time line shows several instances in which an alert signal has been received and detected. A correlator receives a receive signal and correlates with a predetermined alert signal. When an alert signal is the receive signal, the correlator generates a peak in its output signal. The greater the amplitude of the output of the correlator, the more tightly the receive signal correlates with the predetermined alert signal, and therefore, indicating the reception of an alert signal.

As previously described, an embodiment includes the signal patterns of alert signals of different transceivers being different. Therefore, a transceiver can differentiate its own alert signal from alert signals of other transceiver link partners.

Figure 6:
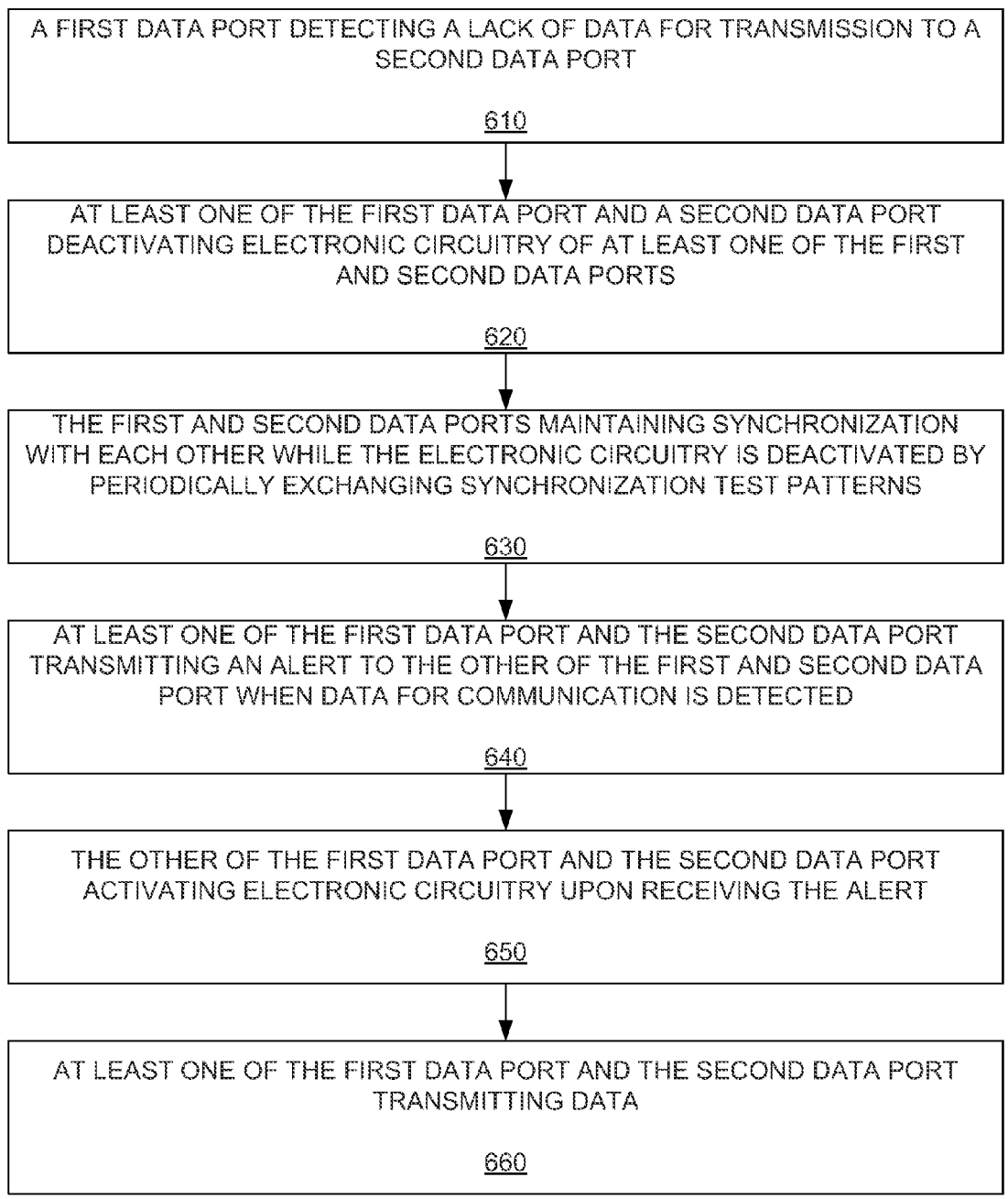
FIG. 6 is a flow chart showing steps of an example of a method of controlling activation of electronic circuitry of data ports of a 10G Ethernet system.

FIG. 6 is a flow chart showing steps of an example of a method of controlling activation of electronic circuitry of data ports of a 10G Ethernet system. A first step 610 includes a first data port detecting a lack of data. A second step 620 includes at least one of the first data port and a second data port deactivating electronic circuitry of at least one of the first and second data ports. A third step 630 includes the first and second data ports maintaining synchronization with each other while the electronic circuitry is deactivated by periodically exchanging synchronization test patterns. A fourth step 640 includes at least one of the first data port and the second data port transmitting an alert to the other of the first and second data port when data for communication is detected. A fifth step 650 includes the other of the first data port and the second data port activating electronic circuitry upon receiving the alert. A sixth step 660 includes the first data port and the second data port exchanging data.

Figure 7:
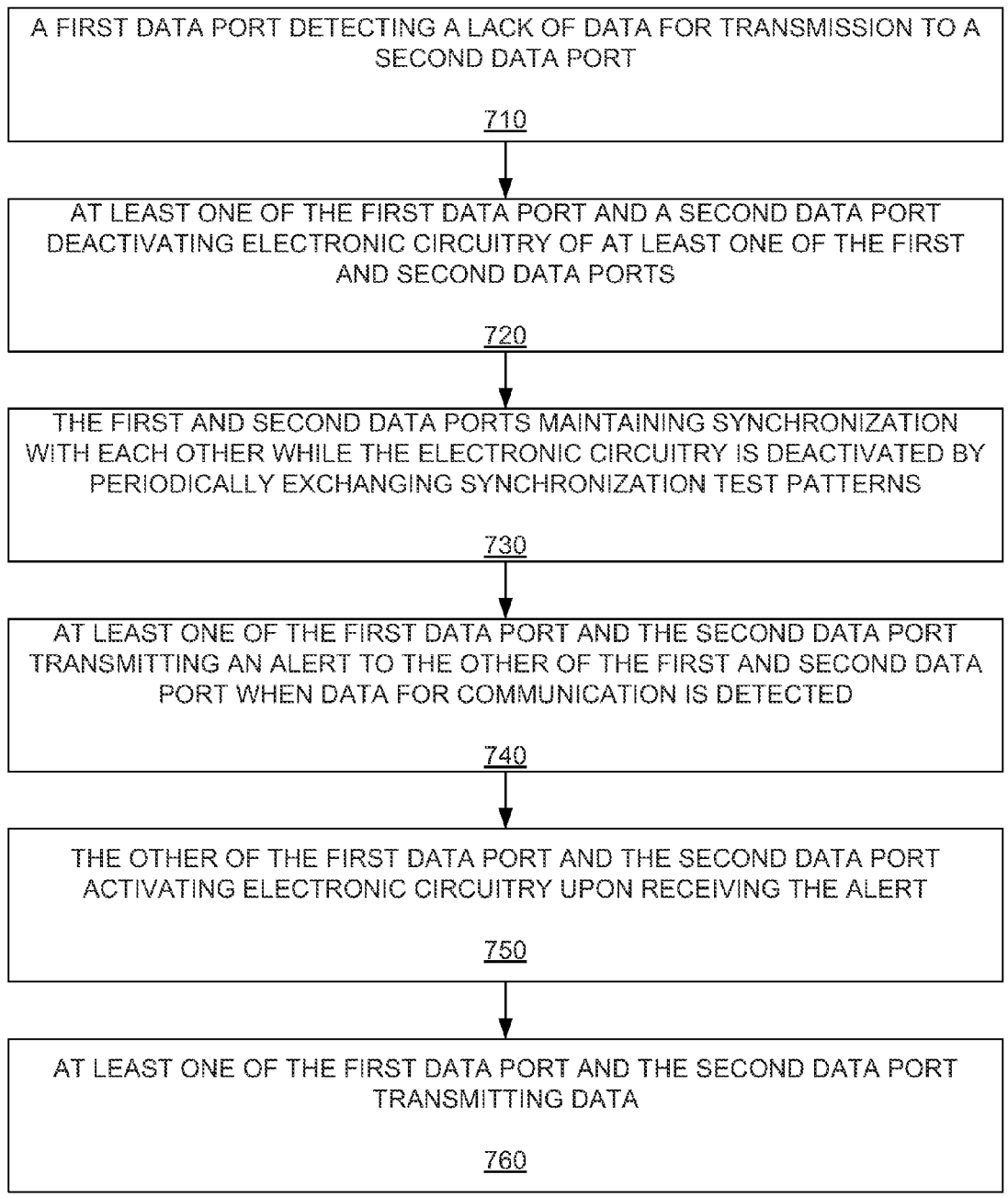
FIG. 7 is a flow chart showing steps of method of controlling activation of electronic circuitry of a data port of a communication system.

FIG. 7 is a flow chart showing steps of method of controlling activation of electronic circuitry of a data port of a communication system. A first step 710 includes the data port detecting a lack of data for transmission to a second data port. A second step 720 includes the data port deactivating electronic circuitry of the data port if a lack of data is detected. A third step 730 includes the data port and a second data port maintaining synchronization with each other while the electronic circuitry is deactivated by periodically exchanging synchronization test patterns. A fourth step 740 includes the data port transmitting an alert to the second data port when data for communication is detected. A fifth step 750 includes the data port transmitting data.

As previously described, the majority of electronic circuitry of the transceivers can be deactivated during the sleep period (period in which data is not available or present for transmission). The electronic circuitry can include, but is not limited to, Echo cancellers, NEXT (near-end cross-talk cancellers, FEXT (far-end cross-talk) cancellers, DFE (decision feedback equalizer) or FEE (feed forward equalizer), and Error-Correction Encoders and Decoders. Also as previously described, at least some circuitry is activated during the refresh periods. For example, timing circuitry can be activated to allow synchronization signals to be transmitted between the transceivers to enable the transceivers to maintain synchronization.

Although specific embodiments have been described and illustrated, the described embodiments not to be limited to the specific forms or arrangements of parts so described and illustrated. The embodiments are limited only by the appended claims.

What is claimed:

1. A method of controlling activation of electronic circuitry of data ports of a 10G Ethernet system, comprising:
   at least one of the first data port and a second data port deactivating electronic circuitry of at least one of the first and second data ports;
   the first and second data ports maintaining synchronization with each other while the electronic circuitry is deactivated by periodically exchanging synchronization test patterns;
   at least one of the first data port and the second data port transmitting an alert to the other of the first and second data port when data for communication is detected;
   the other of the first data port and the second data port activating electronic circuitry upon receiving the alert;
   the first data port and the second data port exchanging data;
   wherein data communication between the first data port and the second data port includes a plurality wired connections connected to the first data port and the second data port, and the alert is transmitted over a subset of the plurality of wired connections,
   further comprising selecting a first alert signal for a master transceiver data port, and selecting a second alert signal for a slave transceiver data port, wherein the first alert signal comprises a series of symbols, and the second alert signal comprises the series of symbols in a reverse order.

2. A data port, comprising
   means for communicating with a second data port of a communication system,
   means for deactivating electronic circuitry of the data port if a lack of data is detected;
   means for the data port to maintain synchronization with the second data port while the electronic circuitry is deactivated by periodically exchanging synchronization test patterns;
   means for the data port transmitting an alert to the second data port when data for communication is detected;
   wherein data communication between the data port and the second data port includes a plurality wired connections connected to the data port and the second data port, and the alert is transmitted over a subset of the plurality of wired connections,
   further comprising means for selecting a first alert signal for a master transceiver data port, and selecting a second alert signal for a slave transceiver data port, wherein the first alert signal comprises a series of symbols, and the second alert signal comprises the series of symbols in a reverse order.

3. The data port of claim 2, further comprising:
   means for designating predetermined time slots;
   means for transmitting the alert during at least one of the predetermined time slots.

4. The data port of claim 3, further comprising adaptively selecting a time period between the predetermined time slots.

5. The data port of claim 3, further comprising adaptively selecting a time-duration of each of the predetermined time slots.

6. The data port of claim 5, wherein the time-duration of the predetermined time slots is adaptively selected based on a desired latency of data transmission.

7. The data port of claim 2, further comprising:
   configuring the alert to comprise a high-autocorrelation signal.

8. The data port of claim 7, wherein configuring the alert to comprise a high-autocorrelation signal comprises selecting a pre-selected signal format.

\* \* \* \* \*